United States Patent [19]

Poland

[11] 3,872,616

[45] Mar. 25, 1975

[54] FISHING DEVICE
[76] Inventor: Maurice D. Poland, 720 N.W. 140th Ter., Miami, Fla. 33168
[22] Filed: Mar. 22, 1974
[21] Appl. No.: 453,961

[52] U.S. Cl. ................... 43/5, 43/4.5, 43/42.05
[51] Int. Cl. ............................................ A01k 97/14
[58] Field of Search ........... 43/5, 17.2, 43.1, 42.02, 43/42.04, 44.88, 4.5, 42.05

[56] References Cited
UNITED STATES PATENTS
2,626,477   1/1953   Richardson .......................... 43/5
2,641,078   6/1953   Gearien .............................. 43/5
3,363,355   1/1968   Kellner ............................... 43/5

Primary Examiner—Louis G. Mancene
Assistant Examiner—Peter K. Skiff
Attorney, Agent, or Firm—John N. Randolph

[57] ABSTRACT

A fishing device attached to a leader or flexible strand to which a fishhook or lure is connected, and having a hollow open end into which the hook is drawn when a pull is exerted on one end of said leader or strand by a fish caught on the hook, so that the mouth of the fish is drawn into said hollow end portion and confined to prevent the fish from flipping the hook out of its mouth. A weak spring is connected to the device and to an end of the leader which connects with a fishing line, to hold said strand or leader end in a restricted position during casting and while fishing, so that the fishhook will be spaced from said open end of the device and in an exposed position to be taken by a fish.

9 Claims, 2 Drawing Figures

FISHING DEVICE

SUMMARY

It is a primary object of the present invention to provide a fishing device having a cavity into which the mouth of a fish is drawn after being caught on a fishhook, associated with the device, to confine the mouth of the fish in such a manner as to prevent the fish from throwing the fishhook out of its mouth.

Another object of the invention is to provide a fishing device having means for holding a fishhook, associated therewith, in an extended position during casting and while fishing so that the fishhook or lure will be exposed to be taken by a fish.

A further object of the invention is to provide a fishing device of the aforedescribed character capable of functioning as a weed guard for a fishhook, or lure associated therewith, and as either a float or a sinker.

Various other objects and advantages of the invention will hereinafter become more fully apparent from the following description of the drawing, illustrating a presently preferred embodiment thereof, and wherein:

DESCRIPTION OF THE PREFERRED EMBODIMENT

Figures 1, 2:
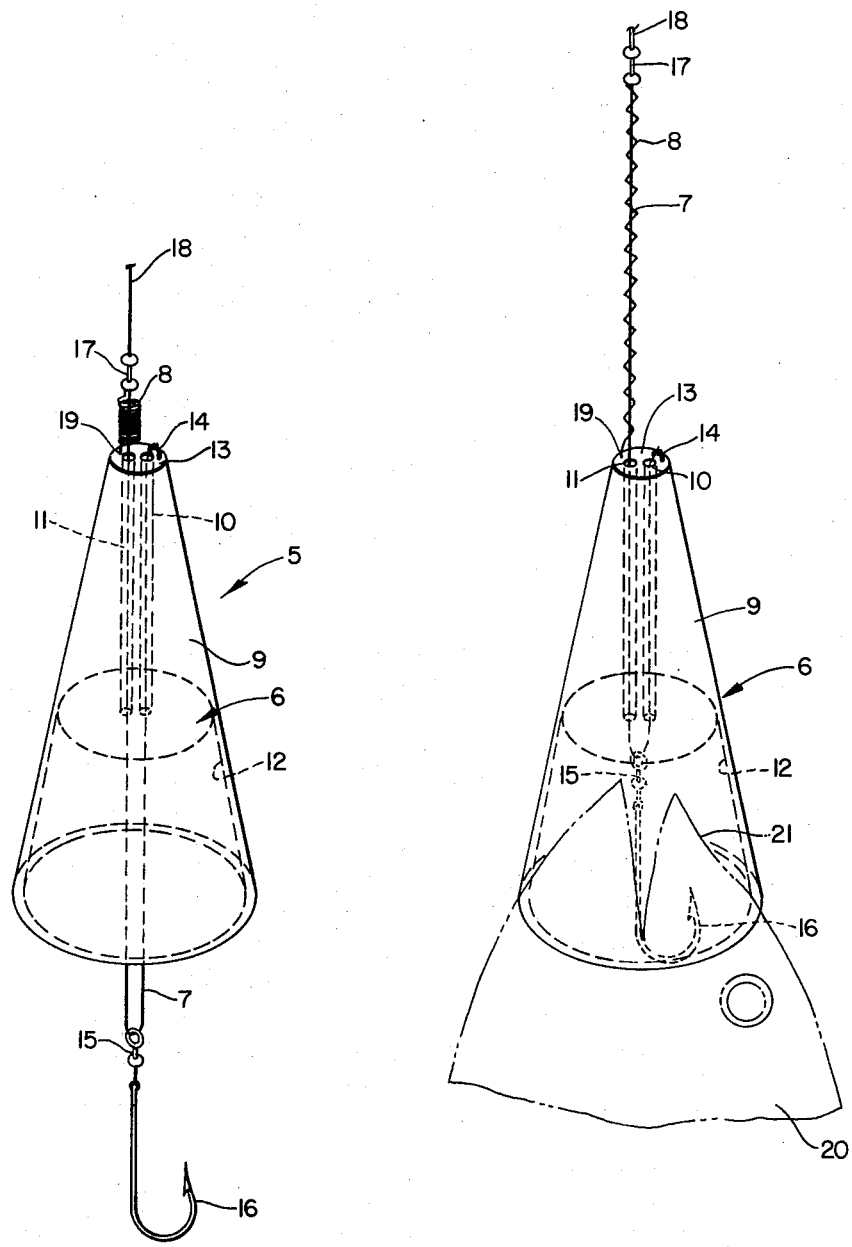
FIG. 1 is a perspective view showing the fishing device associated with a fishhook, fishing line and leader and in a normal position for fishing.
FIG. 2 is a similar view showing the parts as they will appear after a fish has been hooked.

Referring more specifically to the drawing, the fishing device in its entirety and comprising the invention, is designated generally 5 and includes an elongated tapered body member 6, a flexible nonelastic strand 7 and a weak contractile or pull spring 8. The body member 6 is illustrated as being substantially conical or frusto-conical with the smaller end portion 9 thereof being solid except for two bores 10 and 11. The other larger end of the body 6 is hollow to define a cavity 12 which opens outwardly of the enlarged end and into which corresponding ends of the bores 10 and 11 open. The other ends of the bores 10 and 11 open through the restricted end 13 of the body 6.

One end of the strand 7, which preferably constitutes a length of leader material, is anchored at 14 to the end 13 of the member 6. The leader 7 extends from its anchored end 14 through the bore 10 and then through an eye of a swivel 15 to which a fishhook 16 is connected. The leader 7 then extends back through the bore 11, through the spring 8 and is connected to one eye of a swivel 17, to the other eye of which an end of a fishing line 18 is connected. One end of the spring 8 is anchored at 19 to the body end 13, and the other end of said spring is connected to the first mentioned eye of the swivel 17.

As seen in FIG. 1, the spring 8 is normally disposed in its contracted position of FIG. 1, so that the intermediate portion of the leader 7, which engages the swivel 15, is disposed beyond the enlarged open end of the body 6 and with the hook 16 depending from said swivel 15 and in an exposed position. This is the position that the parts will assume for fishing and the spring 8 will maintain the parts in substantially this position during casting.

It will be understood that any suitable bait, not shown, may be applied to the fishhook 16, or any other suitable type of fishing lure may be substituted for the hook 16. When a fish is caught on the hook 16, a pull will be exerted by the fish on the line 18 and the leader end connected to the swivel 17, which will cause the weak spring 8 to yield so that the hook 16 and the mouth 21 of a fish 20 caught on said hook will be drawn into the cavity 12, as seen in FIG. 2. With the mouth 21 of the fish 20 thus confined in the cavity 12, the fish is unable to throw the hook 16 from its mouth and thereby avoid being caught.

The body 6 may be formed of various materials, such as a weighted or non-buoyant material to function as a sinker, or a buoyant material to function as a float for fishing on or near the surface. The body 6 may be made in various shapes, however, by being tapered, as illustrated, said body additionally functions as a weed guard for the fishhook 16.

Various other modifications and changes are contemplated and may be resorted to, without departing from the function or scope of the invention.

I claim as my invention:

1. A fishing device comprising an elongated body having a first end and a second end, said body having a cavity opening outwardly of said first end, a nonelastic strand having end portions extending longitudinally through said body, a first means anchoring one of said end portions to said second end of the body, a second means connecting said other end portion to a fishing line, and a third means slidably connecting a fishing lure to the intermediate portion of said strand, said strand being of a length such that the fish lure is normally disposed beyond said first end of the body, and said cavity being of a size such that when a fish caught on the lure exerts a pull on the fishing line and the strand end connected thereto, the mouth of the fish will be drawn into said cavity and confined thereby to retain the lure in engagement with the mouth of the fish.

2. A fishing device as in claim 1, an elastic means anchored to said second end of the body and to the second means for normally holding said second means and the strand end connected thereto in close proximity to said body.

3. A fishing device as in claim 2, said elastic means comprising a weak contractile spring.

4. A fishing device as in claim 3, said body being tapered from said first end to said second end thereof.

5. A fishing device as in claim 4, said body being substantially solid from said cavity to said second end thereof.

6. A fishing device as in claim 5, said substantially solid body portion having bores extending from said cavity through said second end and through which portions of the strand extend.

7. A fishing device as in claim 5, said body being formed of a weighted material to function as a sinker.

8. A fishing device as in claim 5, said body being formed of a buoyant material to function as a float.

9. A fishing device as in claim 5, said body member constituting a weed guard for the fishing lure.

* * * * *